United States Patent [19]

DeVries et al.

[11] 4,058,644

[45] Nov. 15, 1977

[54] SUBLIMATION TRANSFER AND METHOD

[76] Inventors: Roy F. DeVries, 30 Crosby Lane, Oakland, N.J. 07436; William H. Snyder, 11 Cannon Blvd., Staten Island, N.Y. 10306

[21] Appl. No.: 673,692

[22] Filed: Apr. 5, 1976

Related U.S. Application Data

[63] Continuation-in-part of Ser. No. 529,449, Dec. 4, 1974, Pat. No. 4,021,591.

[51] Int. Cl.[2] .......................... B32B 7/12; D06P 3/60; D06P 5/06

[52] U.S. Cl. .................................... 428/200; 101/470; 101/473; 8/2.5 A; 156/230; 156/240; 427/410-412; 427/146; 427/148; 428/202; 428/334; 428/335; 428/336; 428/424; 428/425; 428/532; 428/537; 428/914

[58] Field of Search ............... 428/914, 424, 425, 200, 428/202, 334, 335, 336, 537, 532; 8/2.5 A; 101/470, 473; 156/230, 240; 427/410, 411, 412, 146, 148

[56] References Cited

U.S. PATENT DOCUMENTS

| | | | |
|---|---|---|---|
| 2,862,281 | 12/1958 | Klausner | 428/394 |
| 3,192,287 | 6/1965 | Pelzek | 428/425 |
| 3,907,974 | 9/1975 | Smith | 428/346 |
| 3,940,246 | 2/1976 | De'Fago | 428/537 |
| 3,984,607 | 10/1976 | Thoma | 428/424 |
| 3,987,225 | 10/1976 | Reed | 428/914 |

FOREIGN PATENT DOCUMENTS

| | | | |
|---|---|---|---|
| 578,197 | 6/1946 | United Kingdom | 427/148 |

OTHER PUBLICATIONS

"Put Urethane on Anything via Transfer Coating," *Modern Plastics*, Mar. 1969, vol. 46 (3), pp. 48-49.

*Primary Examiner*—Ellis Robinson

*Attorney, Agent, or Firm*—Lerner, David, Littenberg & Samuel

[57] ABSTRACT

A dry release sublimation transfer for decorating textile substrates is disclosed, including a temporary backing sheet, a sublimation transfer design layer comprising sublimation transfer inks disposed on the design layer, and a polymeric layer disposed in contact with the sublimation transfer design layer. The polymeric layer comprises a polymer having a number average molecular weight between about 700 and 20,000, and having on the average at least three functional groups comprising isocyanates for each polymer chain thereof, whereby upon application of the sublimation transfer under heat and pressure to the textile substrate which is to be decorated, the polymeric coating softens and penetrates into the textile substrate, along with the sublimation transfer design layer. In a preferred embodiment, the functional groups are blocked, so that upon application of the sublimation transfer under heat and pressure the functional groups on the polymer chain unblock or become reactive, and cross-linking occurs. In one embodiment, the polymer layer comprises an isocyanate functional polyurethane, blocked with phenol. In addition, a method for decorating textile substrates is also disclosed, employing the above-described dry release sublimation transfers.

20 Claims, 3 Drawing Figures

SUBLIMATION TRANSFER AND METHOD

CROSS REFERENCES TO RELATED APPLICATIONS

This application is a continuation-in-part of Ser. No. 529,449, filed on Dec. 4, 1974 now U.S. Pat. No. 4,021,591.

FIELD OF THE INVENTION

The present invention relates to a dry release sublimation transfer particularly suitable for decorating textile substrates, including cotton and cotton-polyester fabrics, and to a method of decorating substrates employing the dry release sublimation transfer, in a simple and efficient manner.

BACKGROUND OF THE INVENTION

Sublimation printing techniques have been employed in the decoration of cloth or fabrics and involve the printing of a design on a paper backing sheet by conventional printing techniques employing sublimation inks, and then transferring such design under heat and pressure to the cloth or fabric. The decorating of 100% polyester fabrics and garments, such as 100% polyester T-shirts, employing such techniques has enjoyed overwhelming success. The sublimation inks, although somewhat dull and off-colored when printed on the paper backing sheet, have been found to produce brilliant colors and clear designs when transferred under heat and pressure to such 100% polyester fabrics or garments.

When it has been attempted to transfer designs comprising sublimation inks to other textiles however, such as 100% cotton fabrics or fabrics formed of cotton-polyester combinations, it has been found that the sublimation designs on such fabrics are weak and easily removed by laundering. It is theorized that the difficulties encountered in attempting to decorate fabrics containing cotton is attributed to the high porosity of cotton and the insolubility of the dyes in the cellulose fibers comprising the cotton.

Various techniques have been suggested in an effort to overcome the problems associated with the decoration of fabrics containing cotton. One technique involves the impregnation of such fabrics with an aqueous solution of an emulsion polymer, drying the so-impregnated fabric, and then transferring a sublimation ink design layer from a paper backing, under heat and pressure, to the so-impregnated fabric. Another technique attempted involves the spray coating of the fabric with a diluted emulsion or solution polymer and thereafter transferring a sublimation ink design layer from a paper backing, under heat and pressure, to the dried, spray-coated fabric.

Unfortunately, it has been found that the above techniques have, for the most part, been unsatisfactory in that the colors of the transferred design upon laundering become faded after a relatively short number of cycles. Furthermore, these prior art techniques require at least two separate steps in effecting the design transfer to the fabric, namely, application of the emulsion polymer to the fabric in a first step, and transferring the sublimation design to the treated fabric in a second step. The requirement of these two separate steps, especially the application of the emulsion polymer to the fabric, makes it practically mandatory that the fabrics be decorated by professionals in a commercial facility so that the emulsion polymer can be applied in the necessary amount and consistency. Moreover, the more attractive marketing approach would be to have the consumer or layman separately purchase the fabric or garment, and the sublimation transfer, and decorate the fabric or garment at home employing a conventional iron as a source of the required heat and by applying pressure to effect the transfer.

As specific examples of these prior art techniques may be included patents such as British patent specification No. 578,197. This patent thus teaches fabric impregnation with a film of organic thermoplastic material followed by application of heat and pressure to cause the material to penetrate the fabric. The specific materials employed are thermoplastic synthetic resins including polymers of vinyl compounds, polymers of acrylic acid esters and methacrylates, etc.

On the other hand, the use of cross-linkable resins for various applications has been known in the past. For example, U.S. Pat. No. 3,907,974 relates to the decoration of metal or glass articles with decalcomanias. The patentee thus teaches the use of cross-linkable resins and cross-linking agents for cross-linking the resins to form adherent decorations resistant to abrasion and chemicals. Specifically, cross-linking agents such as those having blocked isocyanate groups, for example, are shown therein. Such materials have never been employed, however, in connection with the transfer of sublimation transfer inks from backing sheets such as paper to textile fabric materials. Furthermore, it is also noted that in the past such blocked polymer materials have been employed in connection with the coating of wires, and specific reference in this regard is made to U.S. Pat. No. 3,745,138. Generally high molecular weight materials have been employed in connection with such applications. Furthermore, again, these materials have not been employed in the past in connection with processes such as those with which the present application is concerned. Finally, reference to U.S. Pat. No. 3,049,513 is also made here. This patent also relates to the use of certain isocyanate - terminated polyether based polyurethanes as coating compositions. That patent, however, employs polypropylene oxide glycols of specified molecular weights to produce an NCO-terminated urethane compositions for particular end use as coatings, preferably comprising hard urethane films.

SUMMARY OF THE INVENTION

In accordance with the present invention, there is provided a dry release sublimation transfer which may be simply and efficiently applied to a textile substrate, including cotton fabrics, and cotton-polyester fabrics, in a one-step operation to provide a sublimation design of excellent clarity, the colors of which are brilliant and distinct and remain so even after relatively long periods of time and after being subjected to a substantial number of washings. Furthermore, the dry release transfer of the present invention can be easily applied by the layman, at home, employing the conventional home iron, preferably to decorate T-shirts, sweatshirts and similar garments made of cotton or cotton polyester mixtures.

In accordance with the specific teachings of the present invention, there is thus provided a dry release sublimation transfer for the decoration of textile substrates comprising a temporary backing sheet, the temporary backing sheeting having deposited thereon a sublimation transfer design layer formed of one or more sublimation transfer inks, and a polymeric coating disposed in contact with the design layer. The so-formed sublimation transfer is applied to a textile substrate to be decorated, such as a cotton fabric or a cotton-polyester fabric, under heat and pressure, with the backing disposed towards the heat source, so that either the polymeric coating or the design layer, depending upon the specific embodiment employed, contacts the substrate. Application of heat and pressure to the sublimation transfer causes the polymeric coating to soften and penetrate into the substrate while causing the sublimation transfer dyes in the design layer to vaporize and become dispersed in the polymer as it is deposited on the substrate, and furthermore causes cross-linking to occur. Thereafter, upon cooling of the substrate and the design layer and polymeric coating, the polymeric coating securely bonds the design layer to the substrate.

In one embodiment of the present invention, a dry release sublimation transfer is provided including a polymeric layer comprising a polymer having a number average molecular weight of between about 700 and 20,000, and having at least three functional groups comprising isocyanates for each polymer chain thereof, whereby upon application of the transfer to the textile substrate under heat and pressure, the polymeric layer is adapted to soften and penetrate into the textile substrate, and cross-linking occurs. Preferably, the isocyanate functional groups are blocked, so that upon application of the transfer under heat and pressure these groups unblock and/or become reactive, and cross-linking occurs.

In a preferred embodiment of the dry release sublimation transfer of the invention, the temporary backing sheet includes a release coating and the sublimation transfer design layer is deposited on the release coating and thereafter the polymeric coating is deposited on the design layer. Thus, when employing the preferred sublimation transfer for decorating a textile substrate, the sublimation transfer will be positioned on the textile substrate with the polymeric coating forming a layer between the textile substrate and the sublimation transfer design layer.

In yet another embodiment of the dry release sublimation transfer of the invention, the temporary backing sheet includes a release coating to facilitate release of the polymeric coating and design layer therefrom and the polymeric coating is first deposited on the release coating and thereafter the design layer is deposited on the polymeric coating. In this embodiment, when the dry release sublimation transfer is employed for decorating a textile substrate, the sublimation transfer will be positioned on the textile substrate so that the design layer thereof contacts that substrate.

In still another embodiment of the dry release sublimation transfer of the invention, the temporary backing sheet, which preferably includes a release coating thereon, includes a first polymeric coating layer deposited on the release layer, a sublimation design layer deposited on the first polymeric coating layer, and a second polymeric coating layer deposited on the design layer.

With respect to each of the above embodiments of the dry release sublimation transfer of the invention, the sublimation transfer design layer may be printed or laid down on the temporary backing sheet, with or without a release coating, by offset printing or silk screening, the latter method being employed when there are only a relatively small number of different sublimation ink colors in the design layer, and the polymeric coating is printed or laid down on the design layer or the release layer of the temporary backing sheet, depending upon the particular configuration of the final dry release sublimation transfer, by silk screening.

In a preferred embodiment, the polymeric coating, such as in the form of a solution or emulsion polymer, may be deposited directly onto printed paper containing a suitable offset design employing various techniques, including roller coating, brush coating, silk screening, and the like. Preferably, a solution polymer will be employed and a brush or roller coating technique onto the printed paper or temporary backing sheet will be employed.

Further in accordance with the present invention, a method for decorating a textile substrate, such as cotton and cotton-polyester fabrics, with a design comprising one or more sublimation inks is provided, which method includes the steps of providing a dry release sublimation transfer comprising one of the various embodiments thereof described above, positioning the dry release sublimation transfer on a textile substrate to be decorated with the temporary backing sheet disposed away from the substrate, applying heat and pressure to the dry release sublimation transfer, thereby causing the polymeric coating to soften and penetrate into the substrate, while releasing the temporary backing sheet from the design layer, and thereby furthermore obtaining cross-linking of the polymeric layer described herein. Thereafter, the design layer and polymeric coating and textile substrate are cooled, for example, by exposure to ambient air, whereby the polymeric coating securely bonds the design layer to the textile substrate.

DETAILED DESCRIPTION

Figure 1:
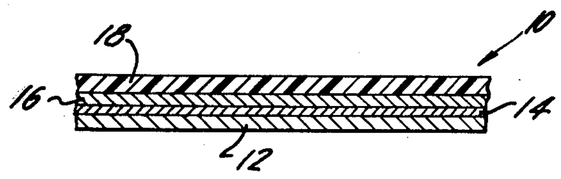
FIG. 1 is a diagrammatic cross-sectional representation of a dry release sublimation transfer in accordance with the present invention.

Referring now to the accompanying Figures, in FIG. 1, there is shown a preferred embodiment of the dry release sublimation transfer of the invention generally indicated by the numeral 10. The dry release sublimation transfer 10 includes a temporary backing sheet 12 having a release layer 14 disposed thereon. Sublimation design layer 16 is disposed over the release layer 14, release layer 14 serving as an imprint receiving support for the design layer 16. Polymeric coating layer 18 is disposed on the sublimation design layer 16.

The temporary backing sheet 12 may comprise a suitable sheet material which is relatively non-porous and substantially impervious to the release layer 14 when the latter is in softened or molten condition. For example, the temporary backing sheet 12 may comprise a paper backing sheet, preferable of the parchment type. However, other materials may be employed in place of paper, such as fiberglass cloth, plastic film, for example, polytetrafluoroethylene, cross-linked phenol-formaldehyde resin, and cross-linked urea-formaldehyde resin, or a thin metal foil or a woven or non-woven fabric, as will be apparent to one skilled in the art.

As indicated above and as shown in FIG. 1, the dry release sublimation transfer can preferably include a release layer 14 disposed on the backing sheet 12. The release layer 14 must be formed of a material which is solid at room temperature and which when heated to the temperatures normally encountered during heat release application of the dry release sublimation transfer of the invention, will soften so that the backing sheet 12 may be easily removed from the remainder of the transfer after application of the transfer to the substrate to be decorated. Thus, the release layer 14 may comprise a wax coating formed of a relatively high melting point wax of vegetable or mineral origin, e.g. vegetable wax having a melting point of from about 130° F. to about 160° F. or a mineral wax having a melting point of from about 180° F. to about 220° F. However, instead of the vegetable or mineral waxes, normally solid polyethylene glycols having a relatively high molecular weight of at least 1000 may be employed. Such materials are wax-like solids and are sold for example by Union Carbide & Carbon Chemicals Corporation under the trademark "Carbowax". Examples of such materials are Carbowax compounds 4000, 6000, and 20M. These wax-like materials can be applied in generally the same manner as ordinary wax coatings. Such normally solid polyethylene glycols have softening points in the range of from about 150° F. so that they are capable of providing the desired heat release properties under a variety of practical operating conditions. Other examples of release layers suitable for use herein include low molecular weight polyethylenes, polytetrafluoroethylene as well as stearic acid, and other high molecular weight fatty acids.

The sublimation design layer 16 may be applied to the release layer 14 of the backing sheet 12 as one or more layers of an organic base sublimation ink or a water-soluble sublimation ink comprising a sublimation dye, such as a disperser dye, including encapsulated dyes, having a sublimation point between 100° C. and 300° C.; a thickener, such as water-soluble colloids, for example, methyl cellulose, sodium carboxymethyl cellulose, carboxymethyl cellulose, or hydrophobic materials such as polyvinyl acetate, polyvinyl chloride, polyketone resins and the like; and sodium alginates; and water. The amount of dye employed is determined by the required depth of shade. Examples of sublimation inks suitable for use herein are set out in French Pat. No. 1,223,330, the disclosure of which is incorporated herein by reference. Examples of dyes suitable for use herein include CI No. 54 Latyl 3G (yellow), CI No. 25 Latyl NST (orange), CI No. 1 Acetamine B (red), CI No. 28 Latyl 2R (blue) and CI No. 2 Latyl MS (brown); the letters "CI" referring to the trade publication entitled "Color Index", all of which dyes are available from E. I. DuPont.

Typical offset sublimation transfer inks suitable for use herein may have the following formulation:

47.9% lithographic varnishes, such as boiled linseed oil;
2.8% paste drier, such as cobalt naphthenate;
0.6% offset ink compound, such as petroleum based waxes or similar materials to give good dispersion and release of dyes, on printing; and
46.6% microencapsulated sublimation dye.

Examples of commercially available offset sublimation transfer inks include the Sinvatherm line of inks such as NW 8380 (blue), NW 6587 (Magenta), NW 6586 (yellow), and NW 7814 (black) distributed by Sinclair & Valentine Co. of North Haven, Conn., and the Lithotex line of inks such as V-0194 (blue), V-5044 (magenta), V-5008 (yellow), and V-0245 (black) distributed by Colonial Inc., Co., of East Rutherford, N.J.

In applying the sublimation design layer 16 to the release layer 14, any conventional printing techniques may be employed, such as offset printing, lithographic or silk screening techniques, the latter technique being employed when the design layer is formed of relatively small number of different colors. Normally, the sublimation design layer 16 will be deposited on release layer 14 so that it has a thickness within the range of from about 0.01 to about 1 mil, so that the sublimation design layer 16 will have sufficient depth so that it may be transferred to a substrate, such as cotton fabric or cotton-polyester fabric with a portion of the design layer penetrating into the pores of the fabric while a portion of such design layer remains on the surface of the fabric. Where the sublimation design layer 16 is substantially greater than about 1 mil, it has been found that when the sublimation design is transferred to the above-mentioned substrates, an unduly thick design layer is deposited on the surface of the substrate.

The polymeric coating layer 18 of this invention has certain critical characteristics. Specifically, it is formed of a polymeric material which upon being subjected to heat and pressure as described below will not only soften and penetrate into the interstices between the individual fibers forming the textile substrate to be decorated, but which also preferably includes functional groups which will set or cross-link during transfer. Furthermore, it is highly preferred that these functional groups be blocked, and that they are selected so as to unblock and thus cross-link during transfer. Preferably, the polymeric coating layer will not immediately become unblocked, but will do so in a manner such that cross-linking does not occur with the temporary backing sheet, particularly when cellulosic materials such as paper are employed for these purposes. It has therefore been found that the molecular weight of the polymeric coating employed, in addition to having the other properties described below, must be between a range from about 700 to 20,000 number average molecular weight, preferably from about 1,000 to 20,000 number average molecular weight, more preferably from about 1,200 to 15,000 number average molecular weight, and most preferably from about 3,000 to 12,000 number average molecular weight.

Furthermore, it has been unexpectedly discovered that there must be at least about three such isocyanate functional groups per polymeric chain in accordance with this invention. It has thus been found that significant cross-linking does not occur without such functionality. Preferably, the polymer will contain on the average, from about 3 to about 10 isocyanate functional groups (preferably blocked isocyanate functional groups) per polymer chain, most preferably from about 4 to 8 such functional units per polymer chain. The actual number of such functional units, however, will be dependant upon the cross-linking characteristics of the polymer selected. Thus, where blocked isocyanate functional groups are employed, the actual number of such functional groups per polymer chain which will be most preferred will be dependant upon the nature of the blocking agent employed. If, for example, the blocking agent unblocks at a lower temperature, fewer functional groups will be preferred since cross-linking will occur more readily, while on the other hand, if the blocking agent unblocks at a higher temperature, a greater number of such functional groups will be preferred. Therefore, with an isocyanate functional polymer blocked with phenol, for example, it will be preferable to employ from about 3 to 10 blocked isocyanate functional groups per polymer chain, and more preferably from about 4 to 8 blocked isocyanate functional groups per polymer chain. It has thus also been discovered that when this functionality is too great, eg. — it increases to greater than about 10 in the case of phenol, the polymer material begins cross-linking too rapidly, that is before the polymer layer softens and penetrates into the textile substrate to be decorated, and significant cross-linking may occur with a paper or other cellulosic temporary backing sheet. In this regard, it has been found that both the molecular weight of the polymer used and the functionality as described hereinabove relate to these problems, and that in order to obtain both the migration of the polymer layer and cross-linking thereof, the use of polymers having both the number average molecular weights and functionalities described hereinabove are required. In this regard it has also been theorized that the distance between functional groups on the polymers employed is also significant, in that if the functional groups which cross-link are too close together, the polymer will be relatively stiff, and will not result in the desired product which is flexible, and relatively uneffected thereby. On the other hand, if the functional groups are too far apart, the polymer will be too soft and poor washability will also result.

The polymeric coating applied in accordance with the present invention should be applied in an amount sufficient to produce a layer 18 having a thickness within the range from about 0.25 to about 6 mils, preferably from about 0.4 to about 4 mils, and most preferably from about 0.5 to about 3 mils.

The preferred polymeric materials described above for use in the present invention comprise polyurethanes including on the average at least three blocked isocyanate functional groups per polymer chain, as described hereinabove.

In a preferred embodiment, polyurethane containing 3 or more blocked isocyanate functional groups are employed. Typical of such isocyanate functional blocked polyurethanes are those having the following average formula: (In this case they are illustrated specifically using a prepolymer made from 2, 4-tolylene diisocyanate and trimethylol propane, with phenol as the blocking agent.).

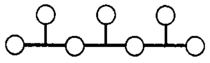

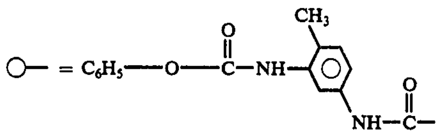

where

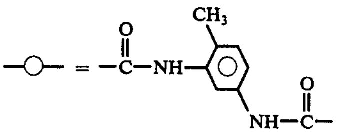

and

-continued

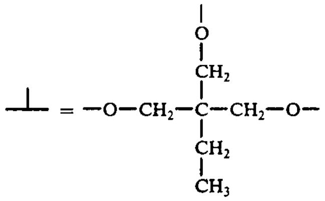

In this regard, the disclosure of U.S. Pat. No. 3,049,513 referred to previously, with regard to the ordered NCO-terminated urethane compositions prepared therein, prior to reaction with his selected polypropyleneoxide glycol, is incorporated herein by reference thereto. In the context of the present invention, isocyanate functional groups, such as blocked isocyanates are employed, that is isocyanates including active hydrogen-containing compounds resulting in an addition product having limited thermal stability. In this manner, while these compounds are quite stable at room temperature, they react at elevated temperatures, i.e. they unblock or become reactive towards alcohol interchange as if the isocyanate were initially present. Thus, while the isocyanate functional polyurethanes themselves may be employed, there would, of course, be considerable difficulty in doing so in view of their instability, particularly in storing them for extended periods, etc. Suitable blocked isocyanate functional polyurethanes are known in the art, as disclosed in "Polyurethane Technology", Paul E. Bruins, Ed., Inter-Science, N.Y. 1969, Pgs. 11-12; "Film-Forming Compositions", Vol. I, Myers and Long, Ed., Marcel Decker, Inc., N.Y. 1967, Pgs. 470–473 and 484–485; and "Polyurethanes, Chemistry and Technolody; Vol. 1, Sanders and Frisch, 1962, Pgs. 118–121, all of which is incorporated therein by reference thereto.

Any of the previously known blocking agents may be used. These include phenols and substituted phenols, alcohols and substituted alcohols, lactams, mercaptans, primary and secondary acid amides, imides, aromatic and aliphatic amines, active methylene compounds, oximes of aldehydes and ketones and salts of sulfurous acid. In addition, however, a large number of specific blocking agents can be employed, as discussed above and these will include those listed at Column 4, lines 15–55 of U.S. Pat. No. 3,773,729, which is incorporated herein by reference thereto. The preferred blocking agents are the phenols and substituted phenols, alcohols, lactams, active methylene compounds and oximes with the phenols being particularly preferred.

These isocyanate functional polyurethanes may be prepared from polyisocyanates, preferably di- and triisocyanates, and polyols. These include diisocyanates such as tolylene diisocyanate (including the 2,4 and 2,6 isomers and blends thereof.); 4,4′ diphenylmethane diisocyanate (MDI), and hexamethylene diisocyanate (HDI), 4,4′ methylene bis (cyclohexyl isocyanate) RMDI, isophorone diisocyanate (IPCI), ethylene diisocyanate, propylene diisocyanate, tetramethylene diisocyanate, phenyl diisocyanate (including all isomers and mixtures thereof), the napthalene diisocyanates; triisocyanates such as triphenylmethane triisocyanate, tolylene-2,4,6-triisocyanate; and reaction products of excess diisocyanates with diols, triols, tetrols, etc.

The polyols which may be employed are those containing at least two hydroxy groups per molecule, such as ethylene glycol, glycerol, pentaerythritol, bisphenol A, trimethylol propane; caster oil and hydrogenated castor oil, diethylene and triethylene glycols, polypropylene oxide diols, triols, tetrols, etc. having molecular weights of from about 200 to 10,000; copolymers, e.g. diols, triols, tetrols, etc. of ethylene oxide and propylene oxide having molecular weights of from about 200 to 20,000; polyethylene oxide diols, triols, tetrols, etc. having molecular weights of from about 200 to 20,000; polyester diols, triols, tetrols, etc. having molecular weights of from about 400 to 20,000; epoxy prepolymer diols, triols, etc. formed from epichlorohydrin and bisphenol A having molecular weights of from about 400 to 4,000; phenol-formaldehyde prepolymer diols, triols, etc. having molecular weights of from about 300 to 4,000; silicone prepolymer diols, triols, etc. having molecular weights of from about 300 to 10,000; low molecular weight partially hydrolyzed polyvinyl acetate having molecular weights of from about 1,000 to 20,000 (containing on the average from about 2 to 4 or more free OH groups per chain; and low molecular weight acrylic copolymers, terpolymers, etc. containing free OH groups being due to the presence of hydroxyethyl or hydroxypropyl ester groups or N-methylol amide groups, the polymers having molecular weights up to about 20,000. It will be appreciated by one skilled in the art that the above list of suitable diols, triols, tetrols, etc. is not complete, and that other hydroxyl-containing materials may be used without departing from the spirit of the present invention. Furthermore, for a discussion of some of the important prepolymers disclosed above, see S. H. Rider and E. E. Hardy "Prepolymer Technology for Crosslinked Plastics", in *Polymerization and Polycondensation Processes,* Advances in Chemistry Series, No. 34, American Chemical Society, Washington, D.C., 1962 pgs. 173–190.

The blocked materials may thus be retained in a stable condition at room temperature with a relatively long shelf life. They can also be prepared as viscous solutions in a variety of solvents, including acetone, methyl ethyl ketone, methyl isobutyl ketone, toluene, the xylenes, chloroform, carbon tetrachloride, cyclohexanone, 1,4-dioxane, n-butyl acetate, n-amyl acetate, n-propyl and isopropyl acetates, ethyl acetate, methylene chloride, tetrahydrofuran, methyl and ethyl cellosolve acetates, dimethylformamide and others. In addition, solvent mixtures may also be employed.

During application in accordance with the present invention, the thus applied polymer coatings are subjected to heat and pressure during transfer. As discussed above, the "un-blocking" temperature of the particular polymer selected is chosen in conjunction with the temperature at which the sublimation dye vaporizes and transfers to the textile substrate. Generally, this will be a temperature of from about 150° to 475° F., preferably 250° to 450° F., and most preferably from about 350° to 420° F. At these temperatures, the unblocking or activation of the blocked groups occurs as follows:

(A) unblocking to form free isocyanate: (illustrated with a phenol blocked material)

$$R{-}NH{-}\overset{\overset{\displaystyle O}{\|}}{C}{-}O{-}\phi \xrightarrow{\text{heat}} R{-}N{=}C{=}O + \phi{-}OH$$

(B) activation to produce alcohol interchange at the blocking site (again with a phenol blocked material)

-continued $$R{-}NH{-}\overset{\overset{\displaystyle O}{\|}}{C}{-}O\,\phi + R'{-}OH \xrightarrow{\text{heat}} R{-}NH{-}\overset{\overset{\displaystyle O}{\|}}{C}{-}OR' + \phi{-}OH$$

Subsequently, where free isocyanate groups are prepared, they can readily react with moisture, or hydroxy groups, such as those present in the cellulosic materials employed, such as cotton, etc., in the following manner:

(C) with moisture:

$$R{-}N{=}C{=}O + H_2O \longrightarrow R{-}NH{-}COOH \xrightarrow{-CO_2} R{-}NH_2$$

Then $$R{-}NH_2 + R'{-}N{=}C{=}O \longrightarrow R'{-}NH\,\overset{\overset{\displaystyle O}{\|}}{C}{-}NH{-}R \quad \text{(a urea linkage)}$$

(D) With R'—OH from cellulose, etc.

$$R{-}N{=}C{=}O + R'\,OH \longrightarrow R{-}NH{-}\overset{\overset{\displaystyle O}{\|}}{C}{-}OR' \quad \text{(a urethane linkage)}$$

These reactions could also occur by the interchange reaction shown previously.

In this manner, and choosing the particular polymer layers discussed herein, the coating becomes permanently embedded in the interstices of the textile fibers, such as cotton fibers, and the resultant product shows excellent permanance, washability, etc.

The polymers employed in the present invention may be utilized in various known forms. It is most preferred, however, that solution polymers be employed herein. It has thus unexpectedly been discovered that while the organic solvents normally employed in connection with such solution polymers (as specified above) normally result in running or dispersion of the design layer when contacted therewith, this is not the case in connection with the solution polymers of the present invention. For example, if the design layer were to be brush coated with acetone, methyl isobutyl ketone, n-butyl acetate, etc. alone, dissolution of the dyes takes place almost instantaneously, the image becomes badly smeared, and the colors run together. On the other hand, when the blocked isocyanate functional urethane prepolymers are also dissolved in these solvents, or mixtures thereof, and the viscosity of the solutions is greater than about 150 centistokes the solution can be brushed on gently with one stroke of the brush without producing any appreciable running of the dyes. Roller coating or silk screening can also be used with similar results, even on freshly printed design layers. Specific examples will be cited below.

Figure 2:
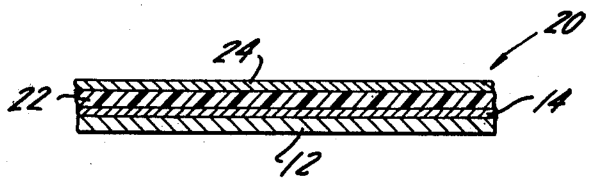
FIG. 2 is a diagrammatic cross-sectional representation of another embodiment of the dry release sublimation transfer of the invention.

Referring now to FIG. 2, there is shown another embodiment of the dry release sublimation transfer of the invention generally indicated by the numeral 20. The dry release sublimation transfer 20 includes a temporary backing sheet 12 having a release layer 14 disposed thereon. Polymeric coating layer 22 is disposed over the release layer 14, and sublimation design layer 24 is disposed on the polymeric coating 22. Thus, it will be seen that in applying the dry release sublimation transfer 22 to a textile substrate, the sublimation design layer 24 directly contacts the textile. However, in the case of the dry release sublimation transfer 10 shown in FIG. 1, the transfer 10 is applied to a textile substrate so that the polymeric coating layer 18 initially contacts the substrate.

In the dry release sublimation transfer 20 shown in FIG. 2, the backing sheet 12, release layer 14, and sublimation design layer 24 are all as described with reference to the transfer embodiment shown in FIG. 1. However, the polymeric coating layer 22 may comprise any of the polymeric materials mentioned above with respect to the FIG. 1 embodiment. Thus, either emulsion polymers or solution polymers may be employed in forming the polymeric coating layer 22, but again, solution polymers are highly preferred.

In applying the polymeric coating layer 22 to the release layer, sufficient polymer is applied so that a polymer thickness of about 0.2 to about 5 mils is present to insure that the polymeric coating will adhere to the release layer and backing sheet.

In the case where solution polymers are employed for forming the polymeric layer 22, solution polymers suitable for use should have a viscosity in the range of from about 500 to about 2,000 or more centipoises and a solids content ranging from about 20 to about 60% by weight.

Figure 3:
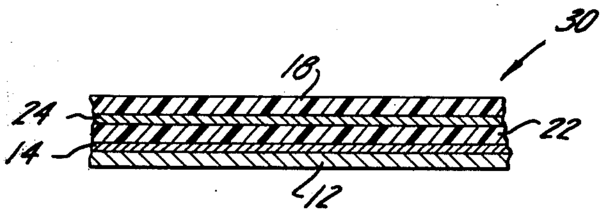
FIG. 3 is a diagrammatic cross-sectional representation of still another embodiment of the dry release sublimation transfer of the invention.

In FIG. 3, there is shown yet another embodiment of the dry release sublimation transfer of the invention which is generally designated by the numeral 30. The dry release sublimation transfer 30 includes a temporary backing sheet 12 having disposed thereon a release layer 14. A first polymeric coating layer 22 is disposed on the release layer and functions as a base for sublimation design layer 24. A second polymeric coating layer 18 is disposed on the sublimation design layer 24 so that the sublimation design layer 24 is, in effect, sandwiched between the first and second polymeric coating layers 22 and 18, respectively. As in the case of FIG. 2, the first polymeric coating layer 22 which functions as a base for the sublimation design layer 24 may comprise any of the polymeric materials set out above, preferably employing a solution polymer. The second polymeric coating 18 will preferably also employ a solution polymer.

It will also be appreciated that the polymeric coating materials employed herein may include from about 2 to about 25% by weight and preferably from about 5 to about 15% by weight of an opacifying agent, such as titanium dioxide, calcium carbonate, calcium fluoride, kaolin, talcum, and the like, where it is designed to decorate a colored substrate.

The polymeric coating materials may also include one or more suitable conventional plasticizers in an amount ranging from about 2 to about 10% by weight to impart increased flexibility thereto as well as lower the glass transition temperature thereof. Examples of plasticizers suitable for use herein include dioctyl phthalate, tricresyl phosphate, chlorinated biphenyl, dibutyl sebacate, dibutyl phthalate, dimethyl phthalate, and other said plasticizers and without any reactive groups thereon.

In employing the dry release sublimation transfer 10, 20 or 30 as shown in FIGS. 1, 2, and 3, respectively, to decorate a substrate material, the transfer is applied so that either a polymeric coating in the case of the transfer of FIGS. 1 and 3 or the sublimation design layer itself in the case of FIG. 2 directly contacts the textile substrate. Thereafter, heat and pressure are applied to the backing sheet, such as by employing a conventional iron or press or even a vacuum press, whereby the dry release sublimation transfer is heated to a temperature within the range of from about 200° to about 450° F., and preferably from about 350° to about 425° F., under a pressure within the range of from about 2 to about 100 psig, and preferably from about 4 to about 50 psig, for a time ranging from about 7 to about 80 seconds and preferably from about 20 to about 40 seconds. At this time, the backing sheet 12 is released from the remainder of the transfer leaving the sublimation design layer and polymeric coating layer embedded in the textile substrate to be decorated. Thereafter, the textile substrate including the polymeric coating and sublimation design layer are allowed to cool, for example, by blowing ambient air over the same. Upon cooling, the polymeric coating layer tightly bonds the sublimation design to the textile substrate.

The textile substrate will thereby be decorated with the sublimation design, which design will be sharp and clear and be composed of bright, pleasing colors. In fact, the transferred design will be substantially brighter and more vivid than the design layer carried by the dry release transfer of the invention. It is believed that during the transfer process described above, the heat applied to the dry release transfer transforms the sublimation dyes of the design layer (which are dull and drab in appearance) to vapors, such vapors contacting the substrate to be decorated containing the embedded polymer and dispersing in said polymer thereon to form a design having the desired bright colors.

Thus, it will be appreciated from the foregoing that the present invention provides a dry release sublimation transfer which includes a sublimation design layer and polymeric coating layer which layers may be transferred simultaneously to a substrate which may comprise cotton or which may be carried out at home by the layman employing a conventional iron or other means for applying heat and pressure to the transfer and substrate.

The present invention may be further understood with reference to the following working examples thereof:

EXAMPLE 1

Tolylene - 2,4 - diisocyanate was reacted with trimethylol propane dissolved in methyl isobutyl ketone at an NCO/OH mole ratio equal to 1.667 to produce a polyurethane prepolymer approximately tetrafunctional in free isocyanate group and having a number average molecular weight of about 2,000. The isocyanate groups were then blocked with phenol in the presence of a stannous octoate catalyst using a 1/1 mole ratio of phenol to isocyanate. The final solution contained about 60% solids and had a viscosity of about 250 centistokes. This solution was diluted 1:1 by volume with acetone and was then brush coated onto printed Transfab 45 – 31T release parchment (Paterson Parchment Paper Co.). After the coating was dried at ambient temperature simultaneous coating and sublimation transfer was carried out onto a cotton T-shirt material at 220° C, and 40 psi. for 30 seconds. The backing sheet was easily removed from the T-shirt material with little or no polymer remaining on the parchment. The transferred image was brilliant and sharp. The hand of the material was slightly stiff, and examination with a low power microscope showed that most of the polymer was embedded in between the fibers making up the cotton threads, with virtually no bridging between the threads. Washability of the transfer using the standard wash cycle (12 minute wash in warm water using Cheer) in a G.E. washer was fair. The hand of the material after washing and drying was soft.

EXAMPLE 2

The acetone diluted solution described in Example 1 was brush coated onto paper printed with sublimation transfer inks, but containing no release agent and allowed to air dry at ambient temperatures for about 1 hour. Simultaneous coating and sublimation transfer was then accomplished, under the conditions of Example 1, to a cotton T-shirt material. The backing sheet was removed and some sticking of the coating remaining on the paper to the textile was noted. The transferred image was brilliant and sharp. Microscopic examination again showed that much of the polymer was embedded in the spaces between the fibers making up the cotton threads. Virtually no bridging between threads was noted. The hand of the material was somewhat stiff. Washability was similar to that in Example 1.

EXAMPLE 3

Tolylene - 2,4 -diisocyanate was reacted with polypropylene oxide triol (number average molecular weight of 1500) dissolved in methylisobutyl ketone at a NCO/OH mole ratio equal to 1.556, and catalysing the latter stages of reaction with stannous octoate. The approximately penta-isocyanate functional urethane prepolymer had a number average molecular weight of about 6000. A portion of the solution which contained about 60% solids and had a viscosity of about 1200 centistokes was diluted 1:1 by volume with acetone and brush coated onto printed sublimation transfer paper containing no release agent. After air-drying for 1 hour at ambient temperature simultaneous coating and sublimation transfer was accomplished onto cotton T-shirt material as in Example 1. The backing sheet was removed easily and very little polymer remained on the paper. The transferred image was bright and sharp though the brightness was not quite as good as in Examples 1 and 2. Microscopic examination showed that virtually all of the polymer was embedded between the fibers of the cotton threads with essentially no bridging between the threads. Washability of the transferred image according to the procedure described in Example 1 was judged to be fair – good. The hand of the material was soft before and after wash.

EXAMPLE 4

A 1:1 by volume mixture was made up from the solution prepolymers prepared in Examples 1 and 2. This mixture was diluted 1:1 by volume with acetone and brush coated onto printed sublimation transfer paper with no release agent and allowed to air dry at ambient temperature for 1 hour. Sublimation transfer was accomplished onto cotton T-shirt material as described in Example 1. Removal of the backing sheet was easy and most of the polymer coating was transferred to the textile. The transferred image was brilliant and sharp. Microscopic examination showed that virtually all the transferred polymer was embedded in the cotton threads with little or no bridging between the threads. The hand of the material was soft before and after washing. Washability of the transferred image by the procedure of Example 1 was judged to be good.

EXAMPLE 5

Hexamethylene diisocyanate was reacted with trimethylol propane and polypropylene oxide diol (number average molecular weight 1000) at diol/triol mole ratio equal to 0.875 and NCO/OH mole ratio equal to 1.47 in the presence of stannous octoate catalyst and methyl isobutyl ketone solution. An equivalent (based on free NCO) of phenol blocking agent was added to the preceeding reaction before it was complete in order to prevent gelation. The final solution contained 62% solids. The average blocked isocyanate functionality per chain was about 5 and the number average molecular weight was about 3000. After diluting a portion of the sample 1:1 by volume with acetone, it was brush coated onto a printed release parchment and air dried for 1 hour. Simultaneous coating and sublimation transfer to cotton T-shirt material was accomplished as in Example 1. Separation of the temporary backing sheet from the fabric occurred easily and the transferred image was brilliant and sharp. Microscopic examination of the so transferred coating revealed that although some polymer was embedded in the cotton threads, there was also a substantial amount of bridging between the threads. The hand of the material was soft before and after washing. Washability as performed according to Example 1, was judged good.

EXAMPLE 6

Tolylene - 2,4 - diisocyanate was reacted with trimethylol propane and polypropylene oxide diol (number average molecular weight 1000) at diol/triol mole ratio equal to 0.875 and NCO/OH mole rate equal to 1.26 in methyl isobutyl ketone solvent. Stannous octoate catalyst was added in the latter stages of reaction. The free isocyanate groups remaining were blocked with an equivalent of phenol in the presence of stannous octoate catalyst. The blocked prepolymer so prepared had a number average molecular weight of about 11,000 and the average blocked isocyanate functionality per chain was about 10. The solution contained 62% solids. A portion of the solution was diluted 1:1 by volume with acetone and brush coated onto printed release parchment. After air drying for 1 hour, simultaneous coating and sublimation transfer was carried out to cotton T-shirt material under the conditions of Example 1. The temporary backing sheet was easily removed from the cloth and a brilliant, sharp image remained on the cotton, said image being dispersed in the coating which had been transferred. The hand of the material was relatively stiff and microscopic examination revealed that although some polymer was embedded in the threads, a substantial amount of bridging had occurred and much polymer remained on the surface of the textile. Thus, it appears that if the average blocked isocyanate functionality per chain is too high, cross-linking occurs too rapidly and flow into the interstices of the cotton fibers making up the threads is undesirably retarded. The washability performed as in Example 1 was good, but the hand of the material remained relatively stiff.

EXAMPLE 7

Tolylene - 2,4 - diisocyanate was reacted with trimethylol propane at NCO/OH mole ratio equal to 3 in 1,4-dioxane as solvent to produce a prepolymer having three free isocyanate groups per chain. The material was blocked with phenol in the presence of stannous octoate catalyst. The final solution contained 55% solids and had a number average molecular weight of 950. A portion of the solution was diluted with acetone and brush coated onto printed release parchment and simultaneous coating and sublimation transfer was accomplished as in Example 1 onto cotton T-shirt material. The backing sheet was easily removed from the cloth and the image produced was bright and sharp. Microscopic examination showed the polymer and dispersed dye to be embedded in the interstices of the cotton threads. Washability according to the procedure described in Example 1 was judged to be fair - poor.

EXAMPLE 8

Tolylene - 2,4- diisocyanate was reacted with trimethylol propane at NCO/OH mole ratio equal to 3 in 1,4-dioxane as solvent to produce a prepolymer having three isocyanate groups per chain. The material was then blocked with an equivalent (based on free isocyanate) of diethylmalonate in the presence of stannous octoate catalyst to produce a prepolymer solution containing 60% solids and having a number average molecular weight of 1200. A portion of the solution was diluted with acetone and brush coated onto printed release parchment, air dired for 1 hour and then transferred to cotton T-shirt material under the conditions of Example 1. The backing sheet was easily removed from the cloth and the transferred image was bright and sharp. In contrast to the results obtained in Example 7, the coating containing the dispersed dyes showed very little penetration into the cotton threads, but stayed on the surface of the textile. Thus, with diethylmalonate as the blocking agent, cross-linking occurred much more readily then in Example 7 so that flow of the prepolymer into the interstices in the cotton threads was almost completely retarded. Examples 7 and 8 establish quite clearly that choice of the blocking agent is critical under otherwise equivalent conditions.

EXAMPLE 9

Diphenylmethane diisocyanate was reacted with phenol at NCO/OH = 4.0 using stannous octoate catalyst and dimethylformamide as solvent. Trimethylol propane was then added at mole ratio NCO/OH = 2 (based on initial isocyanate) and finally sufficient phenol was added to block the remaining isocyanate groups. Solids content was 62% and the average blocked isocyanate functionality per chain was close to 3. A 1:1 by volume mixture of the prepolymer solution so prepared with that prepared in Example 3 was diluted slightly with acetone and brush coated onto printed non-release paper. After drying at 50° C. for 1½ hours simultaneous coating and sublimation transfer was accomplished as described in Example 1 onto cotton T-shirt material. The backing sheet was removed fairly easily with only a slight amount of sticking. The transferred image was reasonably bright and sharp. Some polymer coating remained on the backing sheet, but the bulk was transferred to the textile. Penetration into the cloth was reasonably good and the hand of the material was only slightly stiff. The standard laundering test as described in Example 1 was good. The hand of the material was softer after washing.

EXAMPLE 10

Tolylene - 2,4 - diisocyanate was reacted with polycaprolactone triol (PCP - 0310, Union Carbide) dissolved in methyl isobutyl ketone and having number average molecular weight of about 300 at NCO/OH mole ratio equal to 1.667. The prepolymer solution approximately tetrafunctional in free isocyanate groups per chain was blocked with the stoichiometric amount of phenol in the presence of dibutyl tin dilaurate catalyst. The final solution had a solids content of 57% and a viscosity of about 400 centistokes. A portion of the solution was diluted with acetone and brush coated onto printed non-release paper. After drying for 60 minutes, simultaneous coating and sublimation transfer onto cotton T-shirt material was accomplished as in Example 1. The backing sheet was removed easily and the transferred image was bright and sharp. The hand of the material was slightly stiff. Very little coating remained on the backing sheet. Washability by the procedure described in Example 1 was fair. The hand of the material after wash was still slightly stiff. Essentially all the polymer coating penetrated into the interstices between the cotton fibers making up the threads.

EXAMPLE 11

A 10 weight percent suspension of finely powdered, dry titanium dioxide was made up in a 2:1 by volume mixture of the prepolymer soltuions made in Example 3 and Example 1 respectively. The suspension was diluted with acetone and brush coated onto printed non-release paper and allowed to air dry for 60 minutes. Simultaneous coating and sublimation transfer was accomplished onto cotton T-shirt material as usual. The backing sheet was removed easily and the transferred image was bright and sharp. Penetration of the coating into the fabric was fair to good although some coating with the suspended solid remained on the surface. The hand of the fabric was soft. Washability by the standard test was rated good.

EXAMPLE 12

A 1:1 by volume mixture of the prepolymer solutions from Examples 1 and 3 respectively was diluted with acetone and brush coated onto printed non-release paper. After drying for 1 hour, simultaneous coating and sublimation transfer was made as usual to the following textile fabrics: 50-50 polyester cotton T-shirt material; off white burlap; 100% Orlon acrylic; 100% off-white linen; 80% silk-20% rayon off-white fabric; 100% rayon; 100% off-white wool. The backing sheets were easily removed and the transferred images were bright and sharp in all cases. When sublimation transfer was made to those materials without the polymer coating, the transferred images were in all cases not nearly as bright. Washability of the coated fabrics by the standard test was rated as follows: 50-50 polyester-cotton T-shirt material — fair; 100% Orlon acrylic — good; 100% linen — fair; 80% silk-20% rayon — good; 100% rayon — good; off-white burlap — fair-poor; 100% wool — fair. All the materials had a slightly stiff hand before laundering, but became much softer after one washing. In all cases substantial penetration of the coating into the fabric took place.

EXAMPLE 13

A sample of the acetone diluted mixture utilized in Example 12 was brush coated onto a 4 × 5 inch printed non-release paper and allowed to air dry for 1 hour. Coating and sublimation transfer onto cotton T-shirt material was accomplished with an ordinary household hand iron set on "cotton" using gentle hand pressure (about 2-5 pounds) and keeping the iron in contact with the backing sheet for one minute. The iron was kept in constant motion over the full area of the backing sheet. The backing sheet was then easily removed and the transferred image was bright and sharp. Coating penetration was good. Launderability by the standard procedure was also rated good.

EXAMPLE 14

The acetone diluted coating of Example 12 was brush coated onto unprinted non-release paper and allowed to air dry for 1 hour. The dryed coating was then printed on manually using special crayons containing sublimation dyes of various colors (blue, red, yellow, brown, orange, etc.). Simultaneous coating and sublimation transfer was then accomplished as usual onto cotton T-shirt material. The backing sheet was easily removed and substantially all the coating and sublimation dyes were transferred to the cotton. The images transferred were bright and sharp. Washability by the standard test was good. Penetration of the coating into the fabric was good.

EXAMPLE 15

Tolylene-2,4-diisocyanate was reacted with trimethylol propane at an NCO/OH mole ratio of 2 in methyl isobutyl ketone. Then sufficient poly (propylene oxide) diol of a number average molecular weight of 1025 was added in the presence of stannous octoate catalyst to make the final NCO/OH mole ratio 1.385. After the reaction was complete, a portion of the solution which contained 60% solids was blocked with the stoichiometric amount of phenol in the presence of stannous octoate catalyst. The blocked material had a number average molecular weight of about 5000.

After diluting slightly with acetone, portions of the blocked and unblocked solutions were brush coated onto separate sheets of printed release parchment and allowed to air dry at room temperature for 30 minutes. Simultaneous coating and sublimation transfer was then accomplished as usual onto cotton T-shirt material. The backing sheets were easily removed and the transfers were examined.

The transfer produced by the unblocked material was brilliant and sharp, but it was apparent that the transferred coating remained essentially on the surface of the fabric with little penetration into the threads. The hand of the material was stiff and the surface coating cracked easily. On the other hand, the transfer produced from the blocked material was not quite as brilliant, but substantial penetration of the coating into the cotton fabric was noted to produce a porous "breathable" finish. The hand of the textile was not nearly as stiff and the washability was rated as fair-good.

What is claimed is:

1. A sublimation transfer for decorating a textile substrate comprising a temporary backing sheet, said backing sheet having deposited thereon a sublimation transfer design layer comprising a sublimation transfer ink having a sublimation point between about 100° and 300° C. and a polymeric layer disposed in contact with said design layer, said polymeric layer having a thickness of between about 0.4 and 4 mils and comprising a polymer having a number average molecular weight of between about 700 and 20,000, and having at least 3 functional groups comprising isocyanates for each polymer chain thereof, whereby upon application of said sublimation transfer to said textile substrate under heat and pressure, said polymeric coating is adapted to soften and penetrate into said textile substrate, and said polymer cross-links, at least a portion of said cross-linking being between said polymer and said textile substrate or moisture associated with said textile substrate.

2. The sublimation transfer of claim 1 wherein said isocyanate functional groups are blocked, and furthermore wherein said blocked isocyanate functional groups unblock at a temperature between about 150° and 475° F.

3. The sublimation transfer of claim 2 wherein said functional groups are blocked by a blocking agent selected from the group consisting of phenols, substituted phenols, alcohols, substituted alcohols, lactams, mercaptans, primary amides, secondary amides, oximes, aromatic amines, aliphatic amines, active methylene compounds, and mixtures thereof.

4. The sublimation transfer of claim 2 wherein said polymer comprises on the average from about 3 up to about 10 blocked isocyanates functional groups for each polymer chain thereof.

5. The sublimation transfer of claim 1 wherein said polymer comprises a polyurethane.

6. The sublimation transfer of claim 1 wherein said isocyanate functional groups employ aromatic isocyanates in making the prepolymer.

7. The sublimation transfer of claim 1 wherein said polymeric layer comprises a polymer having a number average molecular weight of between about 1,200 and 15,000.

8. The sublimation transfer of claim 1 wherein said temporary backing sheet includes a release coating to facilitate release of said design layer and said polymeric coating from said temporary backing sheet upon application of heat thereto.

9. The sublimation transfer of claim 1 wherein said polymeric coating is applied as a solution polymer.

10. The sublimation transfer of claim 9 wherein said solution polymer is a solution of a solvent selected from the group consisting of ketones, toluene, xylenes, chloroform, carbon tetrachloride, cyclohexanone, n-butyl acetate, methyl cellusolve acetate, ethyl cellusolve acetate, dimethyl formide, and mixtures thereof.

11. The sublimation transfer of claim 1 wherein said isocyanate functional polymer is prepared from a polyisocyanate selected from the group consisting of the di and tri isocyanates.

12. The sublimation transfer of claim 11 wherein said diisocyanates are selected from the group consisting of tolylene diisocyanate, 4,4- diphenylmethane diisocyanate, hexamethylene diisocyanate, 4,4' methylene bis (cyclohexyl isocyanate), isophorone diisocyanate, ethylene diisocyanate, propylene diisocyanate, the phenyl diisocyanates, the napthalene diisocyanates, and mixtures thereof.

13. The sublimation transfer of claim 11 wherein said triisocyanates are selected from the group consisting of the phenyl triisocyanates, the tolylene triisocyanates, reaction products of excess diisocyanates with triols, and mixtures thereof.

14. A sublimation transfer for decorating a textile substrate comprising a temporary backing sheet, said backing sheet having deposited thereon a sublimation transfer design layer comprising a sublimation transfer ink having a sublimation point between about 100° and 300° C., and a polymeric layer disposed in contact with said design layer, said polymeric layer having a thickness between about 0.4 and 4 mils and a number average molecular weight of between about 1,200 and 15,000, and having at least 3 functional groups comprising isocyanates for each polymer chain thereof, said polymer comprising a blocked isocyanate functional polyurethane, whereby upon the application of said sublimation transfer to said textile substrate under heat and pressure, said polymeric coating is adapted to soften and penetrate into said textile substrate, and said blocked isocyanate groups unblock or become reactive, so that said polymer cross-links, at least a portion of said cross-linking being between said polymer and said textile substrate or moisture associated with said textile substrate.

15. The sublimation transfer of claim 14 wherein said isocyanate functional polyurethanes are blocked by a blocking agent selected from the group consisting of phenol, substituted phenols, alcohols, substituted alcohols, lactams, mercaptans, primary amides, secondary amides, oximes, aromatic amines, aliphatic amines, active methylene compounds, and mixtures thereof.

16. The sublimation transfer of claim 14 wherein said polymeric layer comprises a blocked isocyanate functional polyurethane formulated with an aromatic di or triisocyanate.

17. A method for decorating a textile substrate with a design comprising one or more sublimation inks, which method comprises the steps of providing a dry release sublimation transfer comprising a temporary backing sheet, said backing sheet having deposited thereon a sublimation transfer design layer comprising a sublimation transfer ink having a sublimation point between about 100° and 300° C., and a polymeric layer disposed in contact with said design layer, said polymeric layer having a thickness of between about 0.4 and 4 mils and comprising a polymer having a number average molecular weight of between about 700 and 20,000, and having on the average at least 3 blocked functional groups comprising isocyanates for each polymer chain thereof, whereby upon application of said sublimation transfer to said textile substrate, under heat and pressure including a temperature of between about 200° and 450° F. and a pressure of between about 2 and 100 psi said polymeric coating is adapted to soften and penetrate into said textile substrate, and said polymer cross-links, at least of portion of said cross-linking being between said polymer and said textile substrate or moisture associated with said textile substrate, positioning said dry release sublimation transfer on a textile substrate to be decorated with said temporary backing sheet disposed away from said textile substrate, applying heat and pressure to said dry release sublimation transfer, thereby causing said polymeric layer to soften and penetrate into said substrate, while releasing said temporary backing sheet from said design layer, thereby cross-linking said isocyanate functional groups with said textile or said moisture associated with said textile and cooling said design layer and polymeric coating whereby said polymeric coating is securely embedded in said textile substrate.

18. The method of claim 17 wherein said functional groups are blocked by a blocking agent selected from the group consisting of phenols, substituted phenols, alcohols, substituted alcohols, lactams, mercaptans, primary amides, secondary amides, oximes, aromatic amines, aliphatic amines, active methylene compounds and mixtures thereof.

19. The method of claim 17 wherein said polymer comprises a polyurethane.

20. The method of claim 17 wherein said functional groups result from the use of aromatic di and triisocyanates in formulation of the prepolymer.

* * * * *